United States Patent
Budda

(10) Patent No.: US 9,216,462 B2
(45) Date of Patent: Dec. 22, 2015

(54) ROTARY CUTTING TOOL HAVING A CHIP-SPLITTING ARRANGEMENT WITH TWO DIVERGING GROOVES

(71) Applicant: Iscar, Ltd., Tefen (IL)

(72) Inventor: Eliyahu Budda, Neve Ziv (IL)

(73) Assignee: Iscar, Ltd., Tefen (IL)

( * ) Notice: Subject to any disclaimer, the term of this patent is extended or adjusted under 35 U.S.C. 154(b) by 409 days.

(21) Appl. No.: 13/903,680

(22) Filed: May 28, 2013

(65) Prior Publication Data
US 2014/0356083 A1  Dec. 4, 2014

(51) Int. Cl.
  B23C 5/10  (2006.01)
  B23C 5/00  (2006.01)

(52) U.S. Cl.
  CPC .............. *B23C 5/10* (2013.01); *B23C 2210/086* (2013.01); *B23C 2210/486* (2013.01); *B23C 2250/16* (2013.01); *Y10T 407/1948* (2015.01)

(58) Field of Classification Search
  CPC ............ B23C 5/10; B23C 5/16; B23C 5/165; B23C 2210/0407; B23C 2210/0421; B23C 2210/088; B23C 2210/086
  See application file for complete search history.

(56) References Cited

U.S. PATENT DOCUMENTS

| | | | |
|---|---|---|---|
| 2,855,657 A * | 10/1958 | Erhardt | B23C 5/04 407/115 |
| 3,117,366 A | 1/1964 | Castor, Sr. | |
| 3,548,476 A | 12/1970 | Cave et al. | |
| 4,285,618 A * | 8/1981 | Shanley, Jr. | B23C 5/10 407/54 |
| 4,810,136 A * | 3/1989 | Paige | B23C 5/10 407/54 |
| 7,950,880 B2 * | 5/2011 | Henderer | B23G 5/06 408/222 |
| 2007/0098506 A1 * | 5/2007 | Flynn | B23C 5/003 407/53 |
| 2008/0069650 A1 | 3/2008 | Maushart et al. | |

FOREIGN PATENT DOCUMENTS

| | | |
|---|---|---|
| DE | 299 12 978 U1 | 10/1999 |
| FR | 1 274 316 A | 10/1961 |

OTHER PUBLICATIONS

International Search Report dated Jul. 30, 2014 issued in PCT counterpart application (No. PCT/IL2014/050397).

* cited by examiner

*Primary Examiner* — Will Fridie, Jr.
(74) *Attorney, Agent, or Firm* — Womble Carlyle

(57) ABSTRACT

A rotary cutting tool, having a longitudinal axis, includes a forward cutting portion and a rearward shank portion. The cutting portion includes a peripheral surface that has a plurality of flutes recessed therein. The plurality of flutes extend helically along the longitudinal axis and form a plurality of cutting teeth. Each cutting tooth includes a cutting edge at a rotationally leading edge thereof and a chip-splitting arrangement located at the cutting edge. Each chip-splitting arrangement includes two grooves. The two grooves interrupt the cutting edge and diverge, relative to each other, therefrom in the peripheral surface on opposite sides of an associated plane that is oriented perpendicularly to the longitudinal axis.

27 Claims, 3 Drawing Sheets

ROTARY CUTTING TOOL HAVING A CHIP-SPLITTING ARRANGEMENT WITH TWO DIVERGING GROOVES

FIELD OF THE INVENTION

The subject matter of the present application relates to rotary cutting tools, and in particular, to rotary cutting tools having a chip-forming arrangement.

BACKGROUND OF THE INVENTION

Examples of a rotary cutting tool with a series of chip-forming arrangements that have one notch, or the like, are disclosed in, for example, U.S. Pat. No. 2,855,657, U.S. Pat. No. 3,117,366 and U.S. Pat. No. 3,548,476. An example of a rotary cutting tool with a series of chip-forming arrangements that have three notches is disclosed in, for example, U.S. Pat. No. 4,285,618. An example of a rotary cutting tool with a series of chip-forming arrangements that have a varying number of notches is disclosed in, for example US Patent Application Publication No. 2007/098506.

SUMMARY OF THE INVENTION

In accordance with an aspect of the subject matter of the present application, there is provided a rotary cutting tool, having a longitudinal axis, around which the rotary cutting tool is rotatable in a direction of rotation, the rotary cutting tool comprising:
 a forward portion forming a cutting portion and a rearward portion forming a shank portion, the cutting portion comprising:
  a peripheral surface having a plurality of flutes recessed therein, the plurality of flutes extending helically along the longitudinal axis, and forming a plurality of cutting teeth, each cutting tooth formed between two adjacent flutes and comprising:
   a cutting edge at a rotationally leading edge thereof; and
   a chip-splitting arrangement comprising:
  exactly two grooves including a first and a second groove, the first groove being axially forward of the second groove, wherein the two grooves interrupt the cutting edge and diverge, relative to each other, therefrom in the peripheral surface on opposite sides of an associated plane that is oriented perpendicularly to the longitudinal axis.

It is understood that the above-said is a summary, and that features described hereinafter may be applicable in any combination to the subject matter of the present application, for example, any of the following features may be applicable to the rotary cutting tool:

The two grooves can be spaced apart at the cutting edge by a groove separation distance $D_G$.

The two grooves can form two interrupted portions of the cutting edge, with a non-interrupted portion of the cutting edge extending therebetween, the non-interrupted portion forming a minor cutting edge.

In a view of the chip-splitting arrangement taken perpendicular to the rake surface adjacent the cutting edge, the cutting edge forms a chip-splitting arrangement profile. The chip-splitting arrangement profile can be substantially mirror symmetrical about a plane of mirror symmetry, the plane of mirror symmetry being perpendicular to a tangent line to an imaginary cutting edge helix that is associated with the cutting edge at the chip-splitting arrangement.

The first groove can comprise a first axially forward side wall and a first axially rearward side wall. In a view of the chip-splitting arrangement taken perpendicular to the rake surface adjacent the cutting edge, the first axially forward side wall can have a slightly convex portion and the first axially rearward side wall can have a concave portion, at the cutting edge.

In a view of the chip-splitting arrangement taken perpendicular to the rake surface adjacent the cutting edge, the first axially forward side wall at the cutting edge can have a first axially forward side wall width. The first axially rearward side wall at the cutting edge can have a first axially rearward side wall width. The first axially forward side wall width can be greater than the first axially rearward side wall width.

The second groove can comprise a second axially forward side wall and a second axially rearward side wall. In a view of the chip-splitting arrangement taken perpendicular to the rake surface adjacent the cutting edge, the second axially forward side wall can have a concave portion and the second axially rearward side wall can have a slightly convex portion, at the cutting edge.

In a view of the chip-splitting arrangement taken perpendicular to the rake surface adjacent the cutting edge, the second axially forward side wall at the cutting edge can have a second axially forward side wall width. The second axially rearward side wall at the cutting edge can have a second axially rearward side wall width. The second axially forward side wall width can be less than the second axially rearward side wall width.

In a view of the chip-splitting arrangement taken perpendicular to the rake surface adjacent the cutting edge, the chip-splitting arrangement at the cutting edge can have a chip-splitting arrangement width. The groove separation distance $D_G$ can be in the range $W/12 \le D_G \le W/8$.

The groove separation distance can be greater than 0.1 mm and less than 1.0 mm.

All the first grooves on all the cutting teeth can be helically aligned, about the longitudinal axis with a first groove helix.

When the plurality of flutes are right handed helical flutes the first groove helix is a left handed helix. When the plurality of flutes are left handed helical flutes the first groove helix is a right handed helix. The first groove helix can have a first groove helix angle. The first groove helix angle can be in the range of $49° \le \alpha \le 51°$. The first groove helix angle can be equal to 49.83°.

The first groove can have a varying first groove width decreasing in a direction away from the cutting edge.

The first groove can have a varying first groove depth decreasing in a direction away from the cutting edge.

All the second grooves on all the cutting teeth can be helically aligned, about the longitudinal axis with a second groove helix.

When the plurality of flutes are right handed helical flutes the second groove helix is a right handed helix. When the plurality of flutes are left handed helical flutes the second groove helix is a left handed helix. The second groove helix can have a second groove helix angle. The second groove helix angle can be in the range of $69° \le \beta \le 71°$. The second groove helix angle can be equal to 70°.

The second groove can have a varying second groove width decreasing in a direction away from the cutting edge.

The second groove can have a varying second groove depth decreasing in a direction away from the cutting edge.

The first groove helix angle and the second groove helix angle each can be fixed or vary within the above-stated ranges.

The cutting portion can have a generally cylindrical shape.

Each cutting tooth can comprise exactly two chip-splitting arrangements.

At least one of the two grooves of the chip-splitting arrangement can open out to a rotationally trailing flute.

The two grooves of the chip-splitting arrangement can open out to a rotationally trailing flute. A portion of the peripheral surface bounded by the two grooves of the chip-splitting arrangement and the two adjacent flutes can be trapezoidal in shape.

At least one cutting tooth can comprise at least two chip-splitting arrangements. In a view of each chip-splitting arrangement taken perpendicular to the rake surface adjacent the cutting edge, each chip-splitting arrangement at the cutting edge can have a chip-splitting arrangement width. Each pair of adjacent chip-splitting arrangements on the same cutting tooth can be spaced apart at the cutting edge by a separating distance. The separating distance can be greater than the chip-splitting arrangement width.

The rotary cutting tool can comprise a unitary integral one-piece construction.

The rotary cutting tool can exhibit two-fold rotational symmetry around the longitudinal axis.

BRIEF DESCRIPTION OF THE FIGURES

For a better understanding of the present application and to show how the same may be carried out in practice, reference will now be made to the accompanying drawings, in which.

Figure 1:
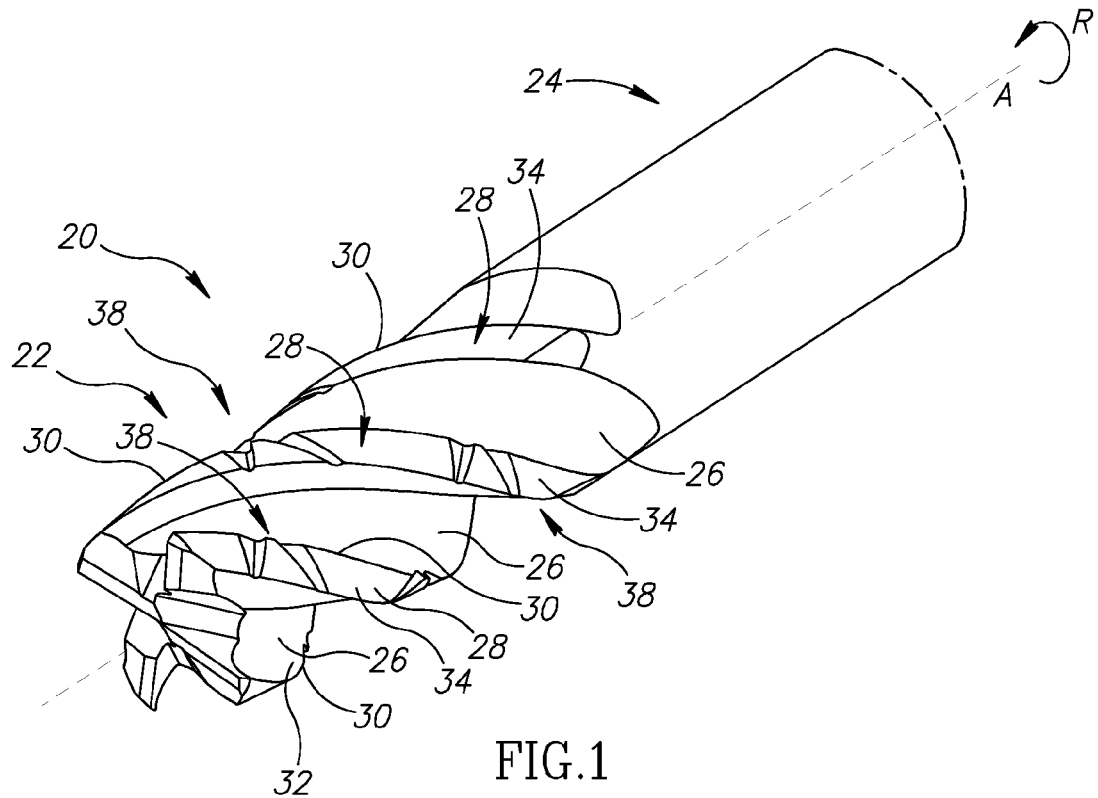
FIG. 1 is a perspective view of a rotary cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, an aspect of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1, showing a rotary cutting tool 20 of the type used for milling operations, in particular finishing operations, in accordance with embodiments of the subject matter of the present application. The rotary cutting tool 20 can be typically made from cemented carbide. The rotary cutting tool 20 can have a unitary integral one-piece construction. The rotary cutting tool 20 has a longitudinal axis A, around which the rotary cutting tool 20 is rotatable in a direction of rotation R. A forward portion of the rotary cutting tool 20 forms a cutting portion 22. A rearward portion of the rotary cutting tool 20 forms a shank portion 24. In accordance with some embodiments of the subject matter of the present application, the cutting portion 22 can have a generally cylindrical shape. The rotary cutting tool 20 can exhibit two-fold rotational symmetry around the longitudinal axis A.

Figure 2:
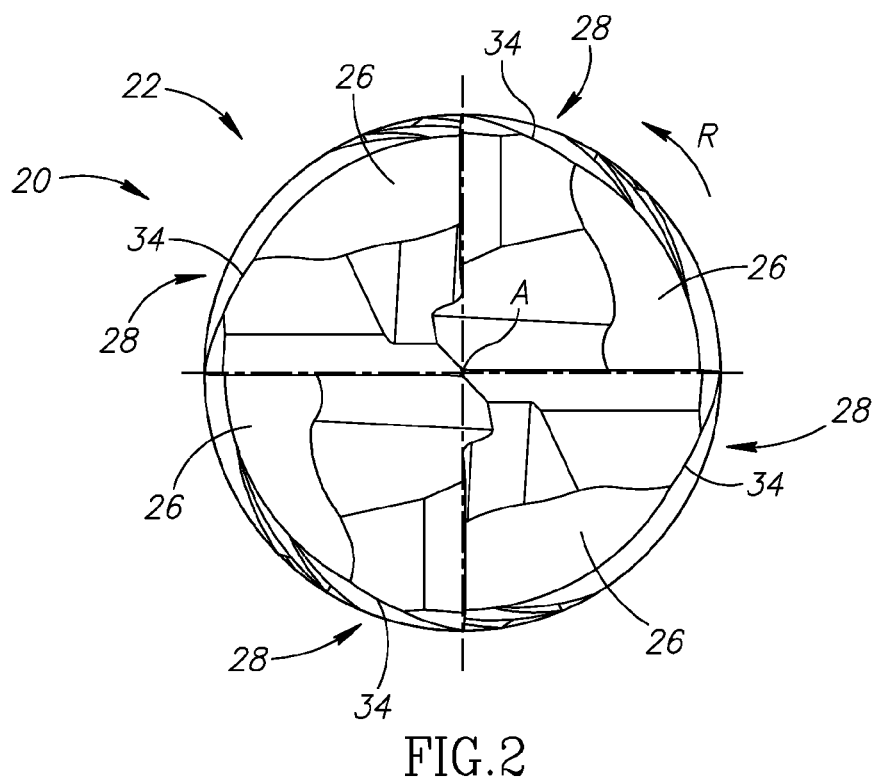
FIG. 2 is a front view of the rotary cutting tool shown in FIG. 1.
Figure 3:
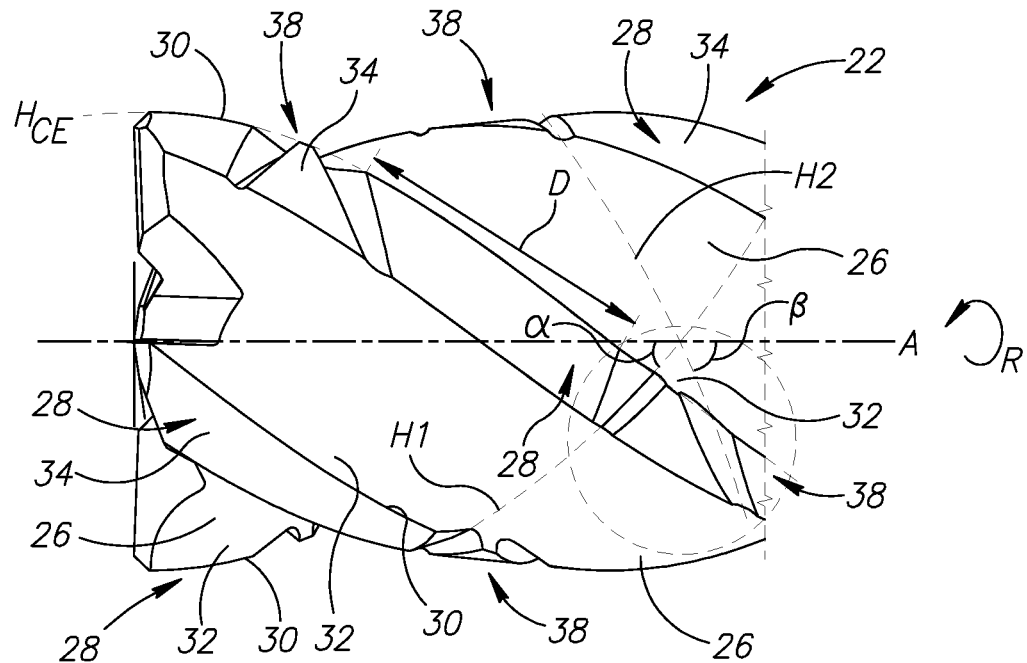
FIG. 3 is a side view of a cutting portion of the rotary cutting tool shown in FIG. 1.

Referring to FIGS. 1, 2 and 3, the cutting portion 22 includes a peripheral surface 34 having a plurality of flutes 26 recessed therein. The plurality of flutes 26 extend helically along the longitudinal axis A. The cutting portion 22 includes a plurality of cutting teeth 28 formed by the plurality flutes 26. Each cutting tooth 28 is formed between two adjacent flutes 26. Each cutting tooth 28 includes a cutting edge 30 at a rotationally leading edge thereof. By virtue of the plurality of flutes 26 extending helically along the longitudinal axis A, each cutting tooth 28 also extends helically along the longitudinal axis A. The peripheral surface 34 extends from the cutting edge 30 to an adjacent flute 26. Each cutting tooth 28 includes a rake surface 32 located in a rotationally leading flute 26. The rake surface 32 has a concave curvature as viewed in a cross-section perpendicular to the longitudinal axis A. Each cutting edge 30 is formed at the intersection of the rake surface 32 and an adjacent peripheral surface 34.

The terms "rotationally leading" and "rotationally trailing" throughout the description and claims refer to a position relative to the direction of rotation R.

Figure 4:
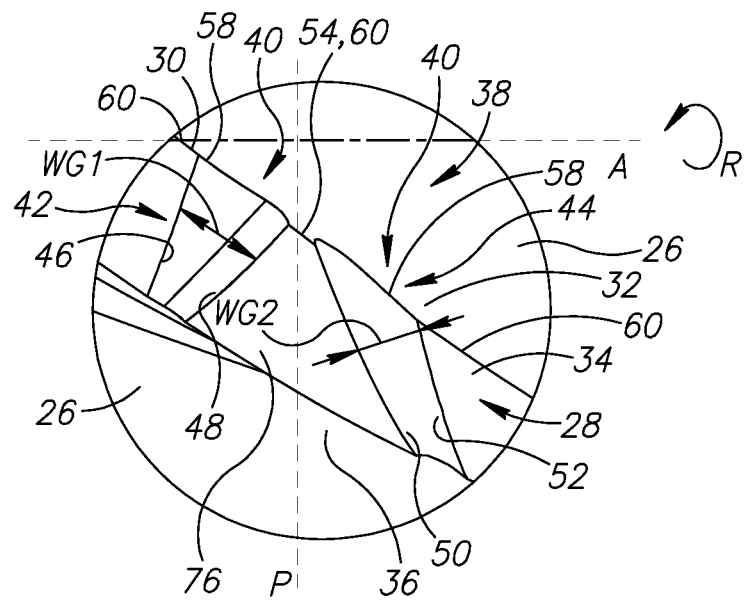
FIG. 4 is a detail in FIG. 3.

Each cutting tooth 28 includes at least one chip-splitting arrangement 38. Referring in particular now to FIG. 4, showing a detail of the cutting portion 22 shown in FIG. 3, the chip-splitting arrangement 38 includes exactly two grooves 40, a first groove 42 and a second groove 44. The first groove 42 is axially forward of the second groove 44. Each groove 40 is formed in the peripheral surface 34, interrupts the cutting edge 30 and opens out to the rake surface 32. The two grooves 40 diverge, with respect to each other, from the cutting edge 30. Each groove 40 extends transversely with respect to the direction of rotation R in the peripheral surface 34. The two grooves 40 extend away from the cutting edge 30 on opposite sides of a plane P that is associated with the chip-splitting arrangement 38 and that is oriented perpendicularly to the longitudinal axis A.

Figure 5:
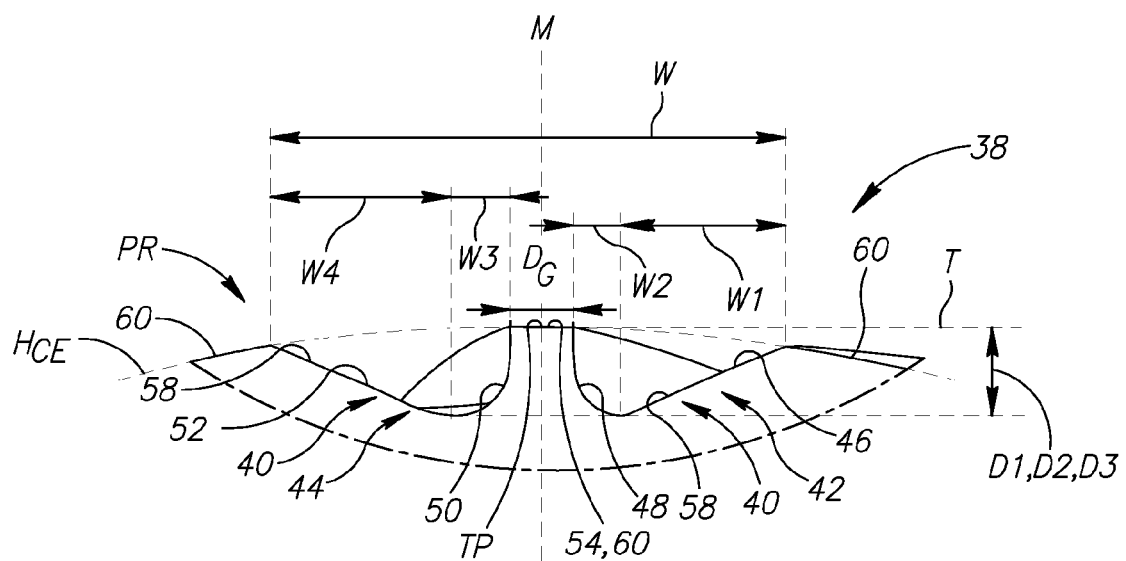
FIG. 5 is a view of the chip-splitting arrangement taken perpendicular to the rake surface adjacent the cutting edge.

As seen particularly in FIGS. 4 and 5, in accordance with some embodiments of the subject matter of the present application, the two grooves 40 can form two interrupted portions 58 of the cutting edge 30, where a non-interrupted portion 60 of the cutting edge 30 can extend between the two interrupted portions 58. In such an embodiment, the two grooves 40 are spaced apart at the cutting edge 30. The non-interrupted portion 60 of the cutting edge 30 extending between the two interrupted portions 58 of the same chip-splitting arrangement 38 is part of the cutting edge 30, and will be referred to as a minor cutting edge 54.

As seen in FIG. 5, each cutting edge 30 is associated with an imaginary cutting edge helix $H_{CE}$. Each chip-splitting arrangement 38 is associated with a tangent line T to the imaginary cutting edge helix $H_{CE}$. The tangent line T is tangent to the imaginary cutting edge helix $H_{CE}$ at a tangent point TP located at a midway point between the two grooves 40. It will be understood that in the embodiment of the present application where the two grooves 40 of the chip-splitting arrangement 38 are not spaced apart, the tangent point TP is located at a point on an imaginary boundary separating the two grooves 40.

In accordance with some embodiments of the subject matter of the present application, in a view of the chip-splitting arrangement 38, taken perpendicular to the rake surface 32 adjacent the cutting edge 30, as shown on FIG. 5, the cutting edge 30 forms a chip-splitting arrangement profile PR. The chip-splitting arrangement profile PR can be substantially mirror symmetrical about a plane of mirror symmetry M, where the plane of mirror symmetry M is perpendicular to the tangent line T and passes through the tangent point TP.

In accordance with some embodiments of the subject matter of the present application, the two grooves 40 can be spaced apart at the cutting edge 30 by a groove separation distance $D_G$. The chip-splitting arrangement 38 at the cutting edge 30 can have a chip-splitting arrangement width W. The groove separation distance $D_G$ can be in the range $W/12 \leq D_G \leq W/8$. The groove separation distance $D_G$ should be greater than 0.1 mm and less than 1.0 mm. The minimum value of the groove separation distance $D_G$ ensures that the minor cutting edge 54 is not pointed or sharp so that it will not break during cutting operations.

The groove separation distance $D_G$ is measured in a direction parallel to the associated tangent line T. Likewise, the chip-splitting arrangement width W is also measured in a direction parallel to the associated tangent line T.

As described hereinabove, each cutting tooth 28 includes at least one chip-splitting arrangement 38. For example, in a specific non-limiting example, each cutting tooth 28 can include exactly two chip-splitting arrangements 38. In another non-limiting example, each cutting tooth 28 can include at least two chip-splitting arrangements 38. In such a configuration, each pair of adjacent chip-splitting arrangements 38 on the same cutting tooth 28 can be spaced apart at the cutting edge 30 by a separating distance D, where the separating distance D is measured as the minimum linear distance between adjacent chip-splitting arrangements 38 along the cutting edge 30 on the same cutting tooth 28. The separating distance D can be greater than the chip-splitting arrangement width W. The chip-splitting arrangements 38 in adjacent cutting teeth 28 can be axially offset with respect to each other.

The first groove 42 can include a first axially forward side wall 46 and a first axially rearward side wall 48. In a view of the chip-splitting arrangement 38 taken perpendicular to the rake surface 32 adjacent the cutting edge 30, the first axially forward side wall 46 can have a slightly convex portion at the cutting edge 30. The first axially rearward side wall 48 can have a concave portion at the cutting edge 30. The first axially forward side wall 46 at the cutting edge 30 can have a first axially forward side wall width W1. The first axially rearward side wall 48 at the cutting edge 30 can have a first axially rearward side wall width W2. The first axially forward side wall width W1 can be greater than the first axially rearward side wall width W2. The first axially forward side wall width W1 and the first axially rearward side wall width W2 are measured in a direction parallel to the associated tangent line T.

All the first grooves 42 on all the cutting teeth 28 can be helically aligned about the longitudinal axis A with a first groove helix H1 having a first groove helix angle α. When the plurality of flutes 26 are right handed helical flutes the first groove helix H1 is a left handed helix. When the plurality of flutes 26 are left handed helical flutes the first groove helix H1 is a right handed helix. The first groove helix angle α can be in the range of $49° \leq α \leq 51°$. In a particular application, optimal performance was obtained with the first groove helix angle α equal to 49.83°. The first groove 42 can have a varying first groove width WG1 that can decrease from a maximum value in a direction away from the cutting edge 30. The first groove 42 can have a varying first groove depth that can decrease from a maximum first groove depth D1 in a direction away from the cutting edge 30. In a cross section of the first groove 42 taken perpendicular to its first groove helix H1, first axially forward side wall 46 can have a slightly convex portion and the first axially rearward side wall 48 can have a concave portion, in the same manner that they are shaped at the cutting edge 30, in a view taken perpendicular to the rake surface 32 adjacent the cutting edge 30. Unless otherwise stated, the term "groove width" throughout the description and claims is measured in a direction perpendicular to that in which the groove extends.

In accordance with some embodiments of the subject matter of the present application, the second groove 44 can include a second axially forward side wall 50 and a second axially rearward side wall 52. In a view of the chip-splitting arrangement 38 taken perpendicular to the rake surface 32 adjacent the cutting edge 30, the second axially forward side wall 50 can have a concave portion at the cutting edge 30. The second axially rearward side wall 52 can have a slightly convex portion at the cutting edge 30. The second axially forward side wall 50 at the cutting edge 30 can have a second axially forward side wall width W3. The second axially rearward side wall 52 at the cutting edge 30 can have a second axially rearward side wall width W4. The second axially forward side wall width W3 can be less than the second axially rearward side wall width W4. The second axially forward side wall width W3 and the second axially rearward side wall width W4 are measured in a direction parallel to the associated tangent line T.

All the second grooves 44 on all the cutting teeth 28 can be helically aligned, about the longitudinal axis A with a second groove helix H2 having a second groove helix angle β. When the plurality of flutes 26 are right handed helical flutes the second groove helix H2 is a right handed helix. When the plurality of flutes 26 are left handed helical flutes the second groove helix H2 is a left handed helix. The second groove helix angle β can be in the range of $69° \leq β \leq 71°$. In a particular application, optimal performance was obtained with the second groove helix angle β equal to 70°. The second groove 44 can have a varying second groove width WG2 that can decrease from a maximum value in a direction away from the cutting edge 30. The second groove 44 can have a varying second groove depth that can decrease from a maximum second groove depth D2 in a direction away from the cutting edge 30. In a cross section of the second groove 44 taken perpendicular to its second groove helix H2, the second axially forward side wall 50 can have a concave portion and the second axially rearward side wall 52 can have a slightly convex portion, in the same manner that they are shaped at the cutting edge 30, in a view taken perpendicular to the rake surface 32 adjacent the cutting edge 30.

The chip-splitting arrangement 38 can have a chip-splitting arrangement depth D3, defined by the greater of the maximum first groove depth D1 and the maximum second groove depth, D2 at the cutting edge 30. It will be understood, as seen in FIG. 5, in a non-limiting example, the maximum first and second groove depths D1, D2 can be equal.

Referring back to FIGS. 3 and 4, in accordance with some embodiments of the subject matter of the present application, at least one of the two grooves 40 of the chip-splitting arrangement 38 can open out to a rotationally trailing flute 26. In a non-limiting example, both grooves 40 of the chip-splitting arrangement 38 can open out to a rotationally trailing flute 26. By virtue of the two diverging grooves opening out to a rotationally trailing flute 26, a portion 76 of the peripheral surface 34 bounded by the two grooves 40 of the chip-splitting arrangement 38 and the adjacent flutes 26 can be trapezoidal in shape.

The design of the two grooves 40 provides effective chip-splitting properties. The rotary cutting tool 20 approaches the work-piece at a predetermined direction and speed, thus defining a depth of cut. By virtue of the fact that the depth of cut is less than the depth of the two grooves 40, a chip is split from the workpiece.

Another feature of the subject matter of the present application is that the orientation of the two grooves 40 of the chip-splitting arrangement 38 provides the rotary cutting tool 20 with improved anti-vibration properties when the rotary cutting tool 20 engages a workpiece. When the chip-splitting arrangement 38 encounters the workpiece, the workpiece applies a force to the first axially rearward side wall 48 in an axially rearward direction. Similarly, the workpiece also applies a force to the second axially forward side wall 50 in an axially forward direction. The two forces have axial components directed towards each other of similar magnitude that act to reduce axial movement of the cutting portion thus having the effect of reducing the vibration of the rotary cutting tool 20.

Although the subject matter of the present application has been described to a certain degree of particularity, it should be understood that various alterations and modifications could be made without departing from the spirit or scope of the invention as hereinafter claimed.

What is claimed is:

1. A rotary cutting tool (20), having a longitudinal axis (A), around which the rotary cutting tool (20) is rotatable in a direction of rotation (R), the rotary cutting tool (20) comprising:
a forward portion forming a cutting portion (22) and a rearward portion forming a shank portion (24), the cutting portion (22) comprising:
a peripheral surface (34) having a plurality of flutes (26) recessed therein, the plurality of flutes (26) extending helically along the longitudinal axis (A), and forming a plurality of cutting teeth (28), each cutting tooth (28) formed between two adjacent flutes (26) and comprising:
a cutting edge (30) at a rotationally leading edge thereof; and
a chip-splitting arrangement (38) comprising:
exactly two grooves (40) including a first and a second groove (42, 44), the first groove (42) being axially forward of the second groove (44), wherein the two grooves (40) interrupt the cutting edge (30) and diverge, relative to each other, therefrom in the peripheral surface (34) on opposite sides of an associated plane (P) that is oriented perpendicularly to the longitudinal axis (A).

2. The rotary cutting tool (20) according to claim 1, wherein the two grooves (40) are spaced apart at the cutting edge (30) by a groove separation distance ($D_G$).

3. The rotary cutting tool (20) according to claim 2; wherein
the two grooves (40) form two interrupted portions (58) of the cutting edge (30), with a non-interrupted portion (60) of the cutting edge (30) extending therebetween, the non-interrupted portion (60) forming a minor cutting edge (54).

4. The rotary cutting tool (20) according to claim 2, wherein in a view of the chip-splitting arrangement (38) taken perpendicular to the rake surface (32) adjacent the cutting edge (30):
the chip-splitting arrangement (38) at the cutting edge (30) has a chip-splitting arrangement width (W); and
the groove separation distance $D_G$ is in the range $W/12 \leq D_G \leq W/8$.

5. The rotary cutting tool (20) according to claim 2, wherein the groove separation distance ($D_G$) is greater than 0.1 mm and less than 1.0 mm.

6. The rotary cutting tool (20) according to claim 1, wherein
in a view of the chip-splitting arrangement (38) taken perpendicular to the rake surface (32) adjacent the cutting edge (30), the cutting edge (30) forms a chip-splitting arrangement profile (PR); and
the chip-splitting arrangement profile (PR) is substantially mirror symmetrical about a plane of mirror symmetry (M), the plane of mirror symmetry (M) being perpendicular to a tangent line (T) to an imaginary cutting edge helix ($H_{CE}$) that is associated with the cutting edge (30) at the chip-splitting arrangement (38).

7. The rotary cutting tool (20) according to claim 1, wherein
the first groove (42) comprises a first axially forward side wall (46) and a first axially rearward side wall (48); and
in a view of the chip-splitting arrangement (38) taken perpendicular to the rake surface (32) adjacent the cutting edge (30), the first axially forward side wall (46) has a slightly convex portion and the first axially rearward side wall (48) has a concave portion, at the cutting edge (30).

8. The rotary cutting tool (20) according to claim 7, wherein in a view of the chip-splitting arrangement (38) taken perpendicular to the rake surface (32) adjacent the cutting edge (30);
the first axially forward side wall (46) at the cutting edge (30) has a first axially forward side wall width (W1);
the first axially rearward side wall (48) at the cutting edge (30) has a first axially rearward side wall width (W2); and
the first axially forward side wall width (W1) is greater than the first axially rearward side wall width (W2).

9. The rotary cutting tool (20) according to claim 1, wherein
the second groove (44) comprises a second axially forward side wall (50) and a second axially rearward side wall (52); and
in a view of the chip-splitting arrangement (38) taken perpendicular to the rake surface (32) adjacent the cutting edge (30), the second axially forward side wall (50) has a concave portion and the second axially rearward side wall (52) has a slightly convex portion, at the cutting edge (30).

10. The rotary cutting tool (20) according to claim 9, wherein in a view of the chip-splitting arrangement (38) taken perpendicular to the rake surface (32) adjacent the cutting edge (30);
the second axially forward side wall (50) at the cutting edge (30) has a second axially forward side wall width (W3);
the second axially rearward side wall (52) at the cutting edge (30) has a second axially rearward side wall width (W4); and
the second axially forward side wall width (W3) is less than the second axially rearward side wall width (W4).

11. The rotary cutting tool (20) according to claim 1; wherein
all the first grooves (42) on all the cutting teeth (28) are helically aligned, about the longitudinal axis (A) with a first groove helix (H1).

12. The rotary cutting tool (20) according to claim 11, wherein
the plurality of flutes (26) are right handed helical flutes and the first groove helix (H1) is a left handed helix or the plurality of flutes (26) are left handed helical flutes and the first groove helix (H1) is a right handed helix;

the first groove helix (H1) has a first groove helix angle α; and the first groove helix angle α is in the range of 49°≤α≤51°.

13. The rotary cutting tool (20) according to claim 12, wherein the first groove helix angle α is equal to 49.83°.

14. The rotary cutting tool (20) according to claim 1, wherein the first groove (42) has a varying first groove width (WG1) decreasing in a direction away from the cutting edge (30).

15. The rotary cutting tool (20) according to claim 1, wherein the first groove (42) has a varying first groove depth decreasing in a direction away from the cutting edge (30).

16. The rotary cutting tool (20) according to claim 1; wherein all the second grooves (44) on all the cutting teeth (28) are helically aligned, about the longitudinal axis (A) with a second groove helix (H2).

17. The rotary cutting tool (20) according to claim 16, wherein the plurality of flutes (26) are right handed helical flutes and the second groove helix (H2) is a right handed helix or the plurality of flutes (26) are left handed helical flutes and the second groove helix (H2) is a left handed helix;

the second groove helix (H2) has a second groove helix angle β, and the second groove helix angle β is in the range of 69°≤β≤71°.

18. The rotary cutting tool (20) according to claim 17, wherein the second groove helix angle β is equal to 70°.

19. The rotary cutting tool (20) according to claim 1, wherein the second groove (44) has a varying second groove width (WG2) decreasing in a direction away from the cutting edge (30).

20. The rotary cutting tool (20) according to claim 1, wherein the second groove (44) has a varying second groove depth decreasing in a direction away from the cutting edge (30).

21. The rotary cutting tool (20) according to claim 1, wherein the cutting portion (22) has a generally cylindrical shape.

22. The rotary cutting tool (20) according to claim 1, wherein each cutting tooth (28) comprises exactly two chip-splitting arrangements (38).

23. The rotary cutting tool (20) according to claim 1, wherein at least one of the two grooves (40) of the chip-splitting arrangement (38) open out to a rotationally trailing flute (26).

24. The rotary cutting tool (20) according to claim 1, wherein the two grooves (40) of the chip-splitting arrangement (38) open out to a rotationally trailing flute (26); and a portion (76) of the peripheral surface (34) bounded by the two grooves (40) of the chip-splitting arrangement (38) and the adjacent flutes (26) is trapezoidal in shape.

25. The rotary cutting tool (20) according to claim 1, wherein at least one cutting tooth (28) comprises at least two chip-splitting arrangements (38); and in a view of each chip-splitting arrangement (38) taken perpendicular to the rake surface (32) adjacent the cutting edge (30), each chip-splitting arrangement (38) at the cutting edge (30) has a chip-splitting arrangement width (W);

each pair of adjacent chip-splitting arrangements (38) on the same cutting tooth (28) are spaced apart at the cutting edge (30) by a separating distance (D); and the separating distance (D) is greater than the chip-splitting arrangement width (W).

26. The rotary cutting tool (20) according to claim 1, comprising a unitary integral one-piece construction.

27. The rotary cutting tool (20) according to claim 1, wherein the rotary cutting tool (20) exhibits two-fold rotational symmetry around the longitudinal axis (A).

* * * * *